(12) United States Patent
Huang et al.

(10) Patent No.: US 11,336,873 B2
(45) Date of Patent: May 17, 2022

(54) ILLUMINATION SYSTEM AND PROJECTION APPARATUS

(71) Applicant: Coretronic Corporation, Hsin-Chu (TW)

(72) Inventors: Kuan-Ta Huang, Hsin-Chu (TW); Jo-Han Hsu, Hsin-Chu (TW); Chi-Tang Hsieh, Hsin-Chu (TW); Yu-Hua Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 46 days.

(21) Appl. No.: 16/937,569

(22) Filed: Jul. 23, 2020

(65) Prior Publication Data

US 2021/0037222 A1 Feb. 4, 2021

Related U.S. Application Data

(60) Provisional application No. 62/880,084, filed on Jul. 30, 2019.

(30) Foreign Application Priority Data

Apr. 17, 2020 (CN) .......................... 202010305143.9

(51) Int. Cl.
*H04N 9/31* (2006.01)
*G02B 27/10* (2006.01)

(52) U.S. Cl.
CPC ....... *H04N 9/3152* (2013.01); *G02B 27/1013* (2013.01)

(58) Field of Classification Search
CPC ............ G02B 27/1013; G03B 21/2006; G03B 21/2033; G03B 21/204; H04N 9/3152
See application file for complete search history.

(56) References Cited

U.S. PATENT DOCUMENTS

| 6,166,838 | A | * | 12/2000 | Liu | ......................... | G02B 6/272 |
| | | | | | | 398/1 |
| 10,386,710 | B2 | * | 8/2019 | Yang | .................... | G03B 21/204 |

(Continued)

FOREIGN PATENT DOCUMENTS

| CN | 105278226 | 1/2016 |
| CN | 208188567 | 12/2018 |

(Continued)

OTHER PUBLICATIONS

"Office Action of China Counterpart Application", dated Jul. 6, 2021, p. 1-p. 8.

(Continued)

*Primary Examiner* — Magda Cruz
(74) *Attorney, Agent, or Firm* — JCIPRNET

(57) ABSTRACT

An illumination system includes an excitation light source module, a light splitting and combining module, a filter module, and a wavelength conversion module. The excitation light source module provides an excitation beam. The light splitting and combining module is disposed on a transmission path of the excitation beam. The excitation beam includes a first and a second excitation beam which are different from each other in polarization state or wavelength range. The filter module is disposed on the transmission path of the excitation beam. The filter module includes a light passing area configured to allow the excitation beam to pass there-through and a light filtering area. The wavelength conversion module is disposed on the transmission path of the excitation beam reflected by the light filtering area and configured to convert the reflected excitation beam into a conversion beam. A projection apparatus including the above illumination system is also provided.

20 Claims, 11 Drawing Sheets

(56) References Cited

U.S. PATENT DOCUMENTS

| | | | | |
|---|---|---|---|---|
| 2013/0322056 A1* | 12/2013 | Konuma | ............... | F21V 13/14 |
| | | | | 362/84 |
| 2015/0338061 A1* | 11/2015 | Huang | ............... | G03B 21/2013 |
| | | | | 353/31 |
| 2015/0362830 A1* | 12/2015 | Liao | ............... | G03B 21/204 |
| | | | | 353/31 |
| 2016/0327851 A1* | 11/2016 | Liao | ............... | G03B 21/2066 |
| 2018/0173087 A1* | 6/2018 | Hsieh | ............... | G03B 21/204 |
| 2019/0369470 A1* | 12/2019 | Yang | ............... | G02B 27/141 |
| 2020/0026173 A1* | 1/2020 | Chen | ............... | G03B 33/08 |
| 2020/0124955 A1* | 4/2020 | Hu | ............... | G03B 21/204 |

FOREIGN PATENT DOCUMENTS

| | | |
|---|---|---|
| CN | 208547803 | 2/2019 |
| CN | 208588892 | 3/2019 |
| CN | 208752383 | 4/2019 |
| JP | 2016161709 | 9/2016 |
| JP | 2018105941 | 7/2018 |
| JP | 2019061237 | 4/2019 |

OTHER PUBLICATIONS

"Search Report of Europe Counterpart Application", dated Dec. 8, 2020, pp. 1-7.

* cited by examiner

ILLUMINATION SYSTEM AND PROJECTION APPARATUS

CROSS-REFERENCE TO RELATED APPLICATION

This application claims the priority benefits of U.S. provisional application Ser. No. 62/880,084, filed on Jul. 30, 2019, and China application serial no. 202010305143.9, filed on Apr. 17, 2020. The entirety of each of the above-mentioned patent applications is hereby incorporated by reference herein and made a part of this specification.

BACKGROUND

Technical Field

The invention is related to a display device, and more particularly to an illumination system and a projection apparatus including the illumination system.

Description of Related Art

With the development of projection technology, information presentation methods have been diversified. A projection apparatus may include an illumination system, a light valve, and a projection lens. The illumination system may generate desired color light beams using an excitation light source in combination with a phosphor wheel, and may improve color purity by a filter wheel provided. In one aspect, since the phosphor wheel requires an embedded blue light reflection mirror, the phosphor wheel is likely to wobble when rotating, resulting in an unstable optical path of a reflected excitation beam and further reducing the light use efficiency of the projection apparatus. In addition, the excitation beam emitted from the filter wheel may enter a light homogenizing element (e.g. an integrator rod) at a small angle, which may reduce the uniformity of the overall light output.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an illumination system preferable in a more stable beam transmission path and a more uniform illumination beam.

The invention provides a projection apparatus preferable in better light use efficiency.

In order to achieve one, some, or all of the above objectives, an embodiment of the invention provides an illumination system. The illumination system includes an excitation light source module, a light splitting and combining module, a filter module, and a wavelength conversion module. The excitation light source module is configured to provide at least one excitation beam. The light splitting and combining module is disposed on a transmission path of the at least one excitation beam from the excitation light source module. The at least one excitation beam from the light splitting and combining module includes a first excitation beam and a second excitation beam which are different from each other in polarization state or wavelength range. The filter module is disposed on the transmission path of the at least one excitation beam from the light splitting and combining module. The filter module has a light passing area configured to allow the at least one excitation beam to pass there-through and at least one light filtering area configured to reflect the at least one excitation beam. The wavelength conversion module is disposed on the transmission path of the at least one excitation beam reflected by the at least one light filtering area and is configured to convert the at least one excitation beam reflected by the at least one light filtering area into a conversion beam and reflect the conversion beam so that the conversion beam is transmitted toward the at least one light filtering area. The at least one excitation beam passing through the light passing area and the conversion beam passing through the at least one light filtering area form an illumination beam.

In order to achieve one or some or all of the above objectives, an embodiment of the invention provides a projection apparatus. The projection apparatus includes an illumination system, a light valve, and a projection lens. The illumination system includes an excitation light source module, a light splitting and combining module, a filter module, and a wavelength conversion module. The excitation light source module is configured to provide at least one excitation beam. The light splitting and combining module is disposed on a transmission path of the at least one excitation beam from the excitation light source module. The at least one excitation beam from the light splitting and combining module includes a first excitation beam and a second excitation beam which are different from each other in polarization state or wavelength range. The filter module is disposed on the transmission path of the at least one excitation beam from the light splitting and combining module. The filter module has a light passing area configured to allow the at least one excitation beam to pass there-through and at least one light filtering area configured to reflect the at least one excitation beam. The wavelength conversion module is disposed on the transmission path of the at least one excitation beam reflected by the at least one light filtering area and is configured to convert the at least one excitation beam reflected by the at least one light filtering area into a conversion beam and reflect the conversion beam so that the conversion beam is transmitted toward the at least one light filtering area. The at least one excitation beam passing through the light passing area and the conversion beam passing through the at least one light filtering area form an illumination beam. The light valve is disposed on a transmission path of the illumination beam from the illumination system and is configured to convert the illumination beam into an image beam. The projection lens is disposed on a transmission path of the image beam from the light valve.

Based on the above, in the illumination system and the projection apparatus of the embodiments of the invention, the at least one excitation beam from the excitation light source module, after passing through the light splitting and combining module, forms two excitation beams which are different from each other in polarization state or wavelength range. The two excitation beams, after passing through the light passing area of the filter module, form a part of the illumination beam, and the part of the illumination beam is improved in uniformity. In another aspect, since there is no need to transmit the two excitation beams to the wavelength conversion module, their transmission path is improved in stability, which contributes to an improvement in light use efficiency of the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
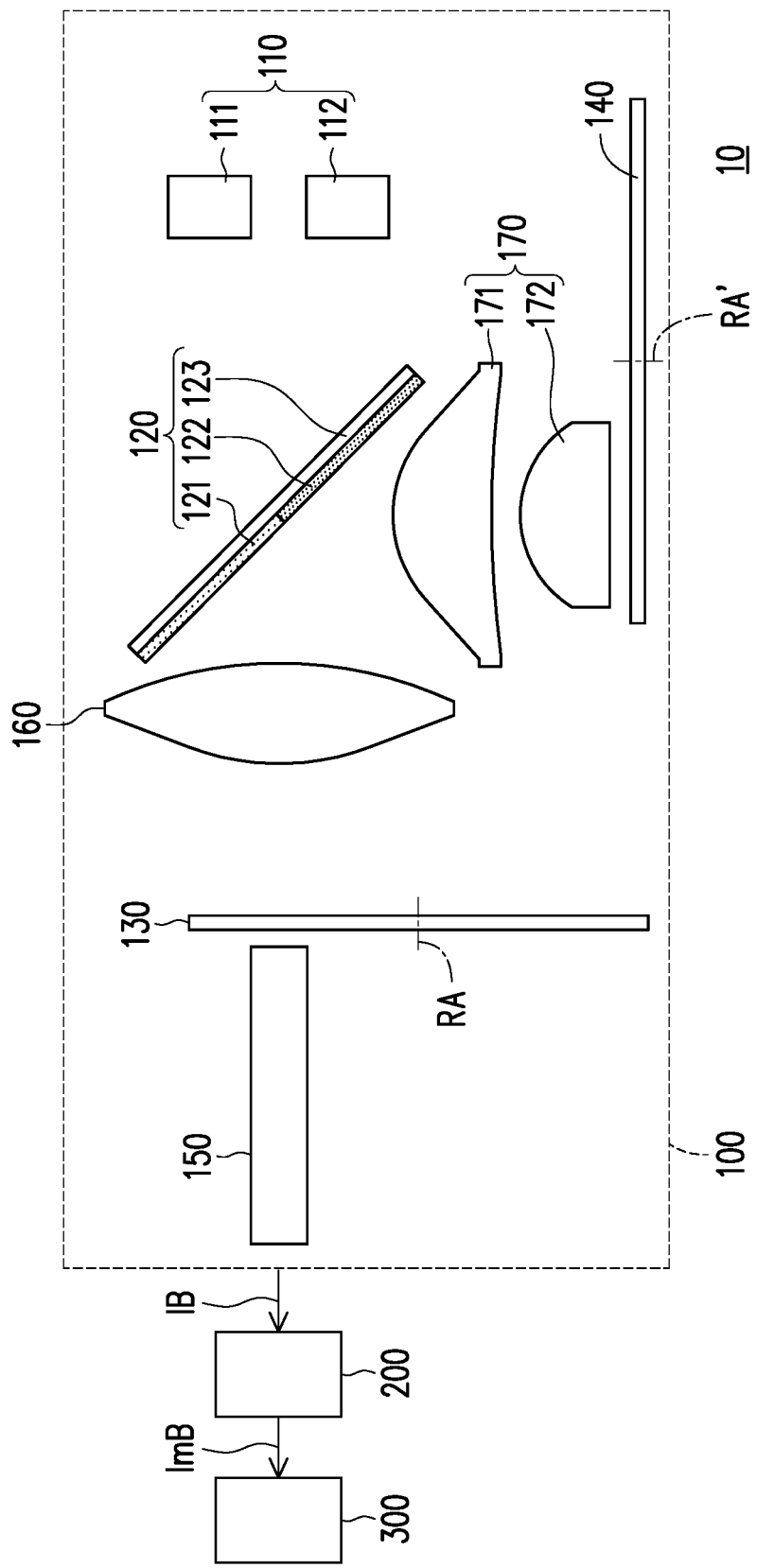
FIG. 1 is a schematic view of a projection apparatus according to an embodiment of the invention.
Figure 2:
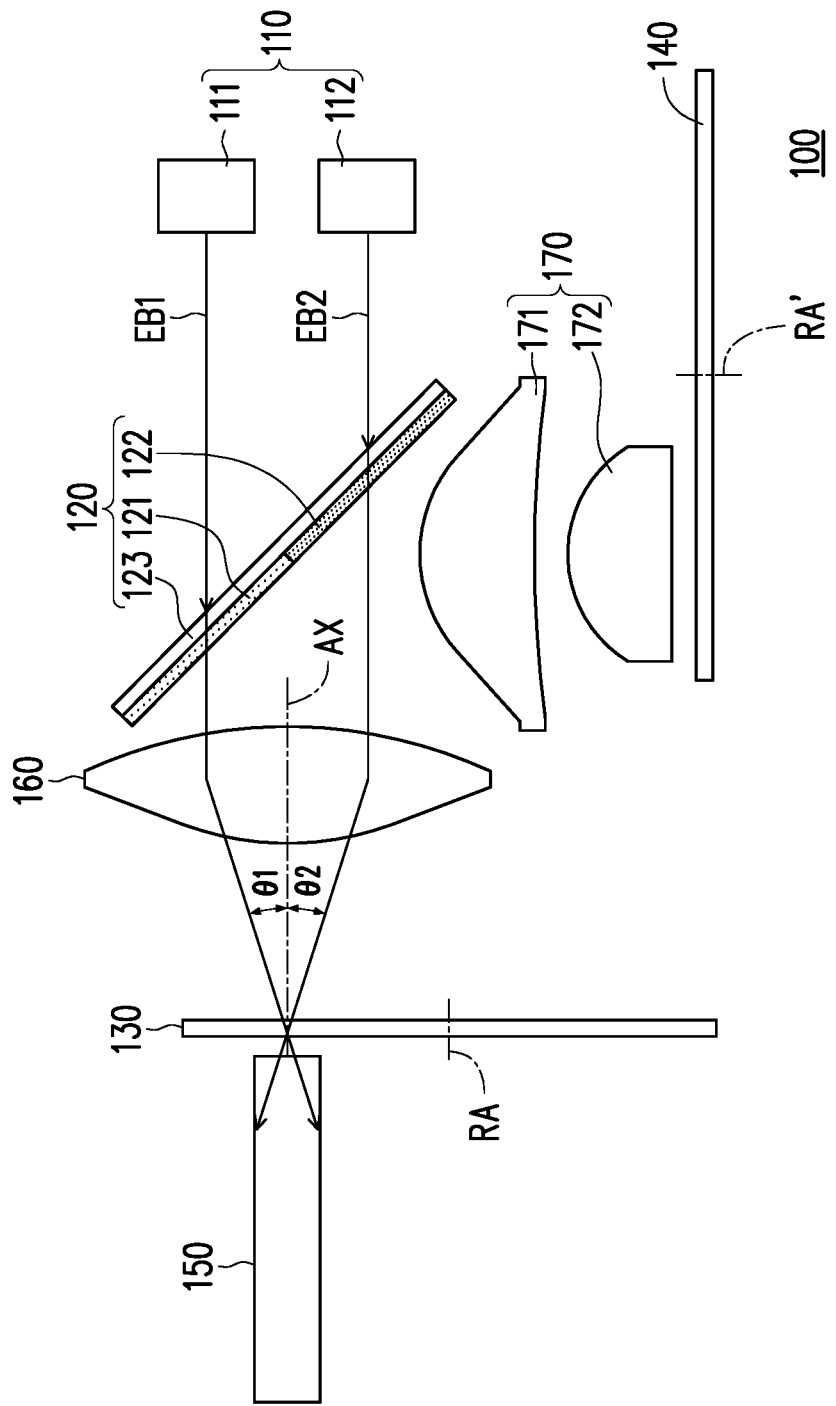
FIGS. 2 and 3 are schematic views of optical paths of the illumination system of FIG. 1 in different time sequences.
Figure 3:
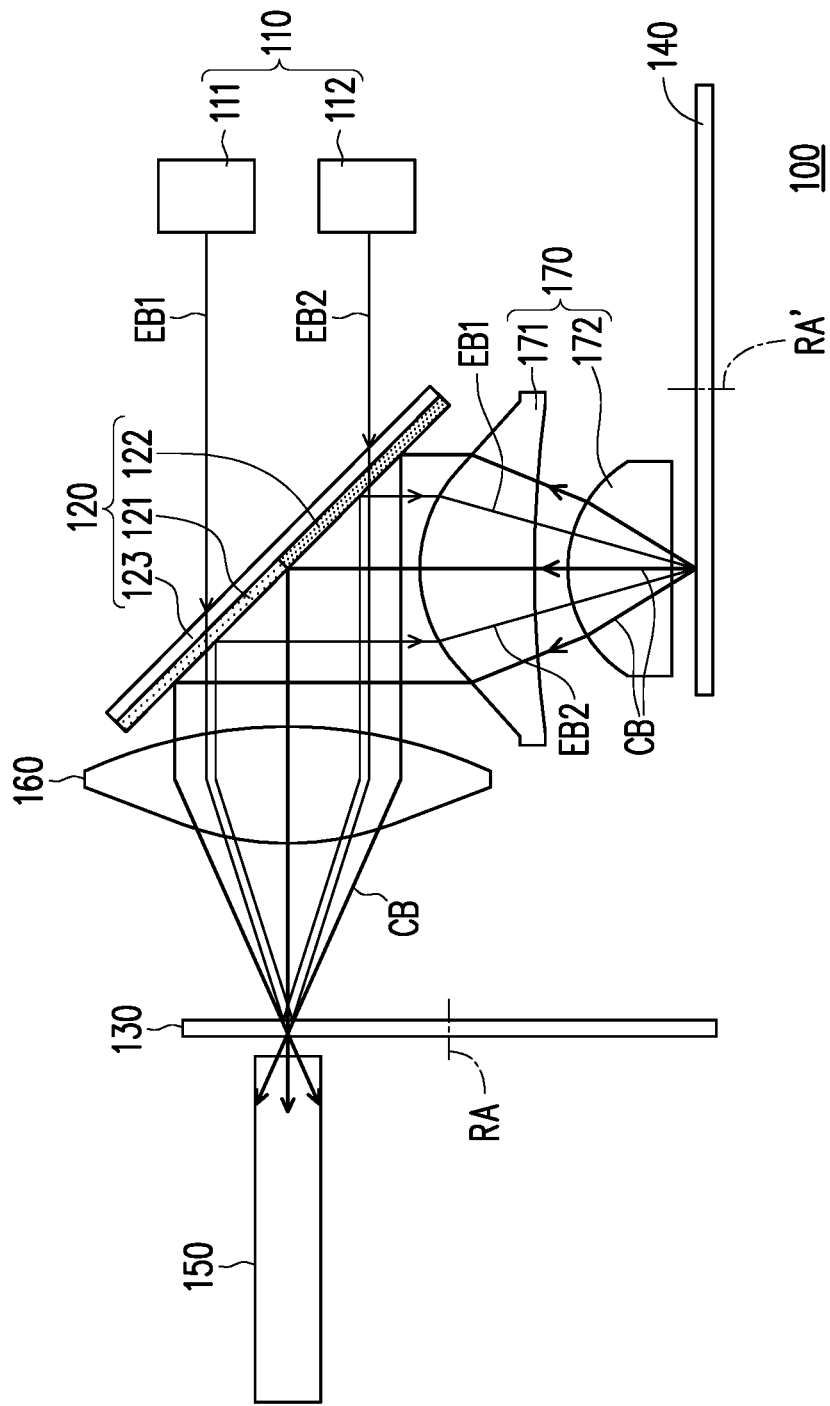
Figure 4:
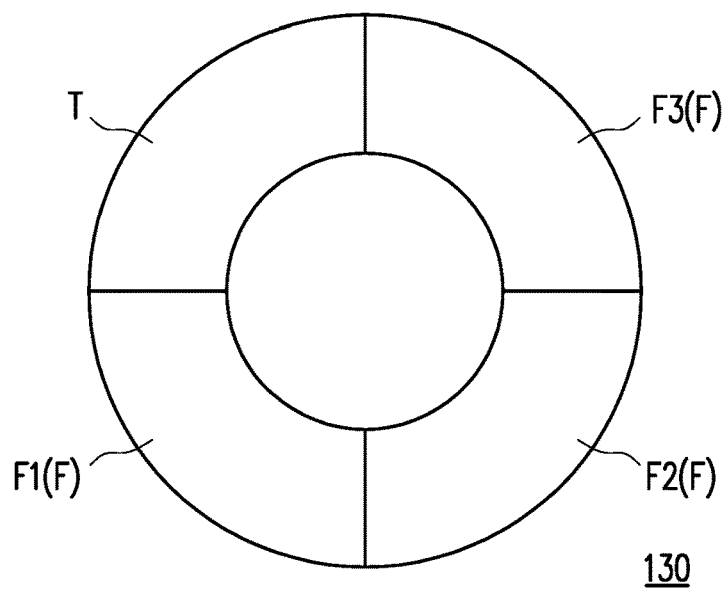
FIG. 4 is a schematic view of a filter module of FIG. 1.
Figure 5A:
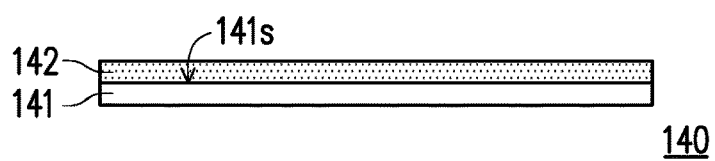
FIG. 5A is a schematic side view of a wavelength conversion module of FIG. 1.
Figure 5B:
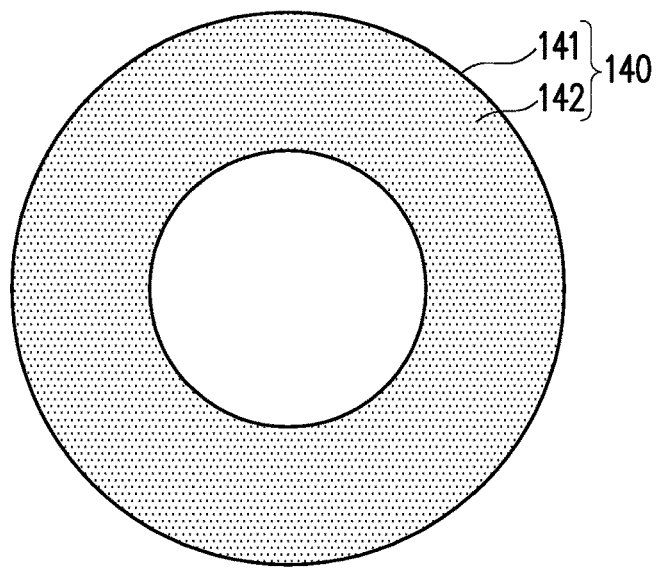
FIG. 5B is a schematic front view of the wavelength conversion module of FIG. 1.
Figure 6:
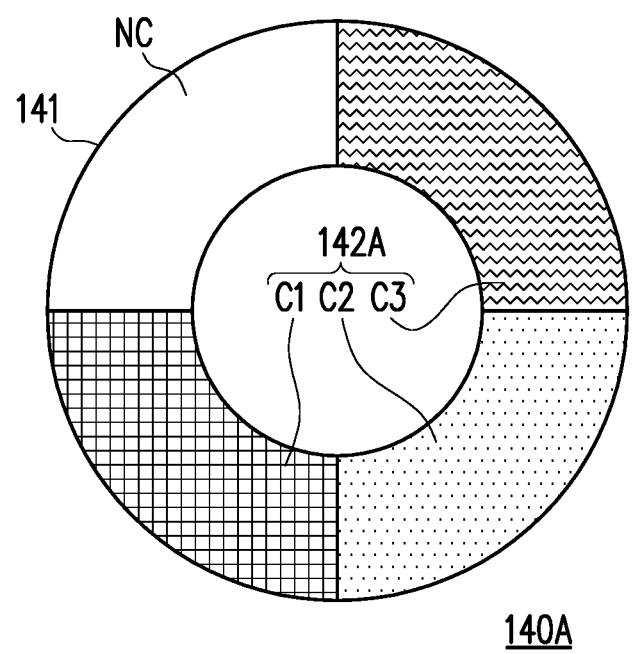
FIG. 6 is a schematic view of a wavelength conversion module according to another embodiment of the invention.
Figure 7:
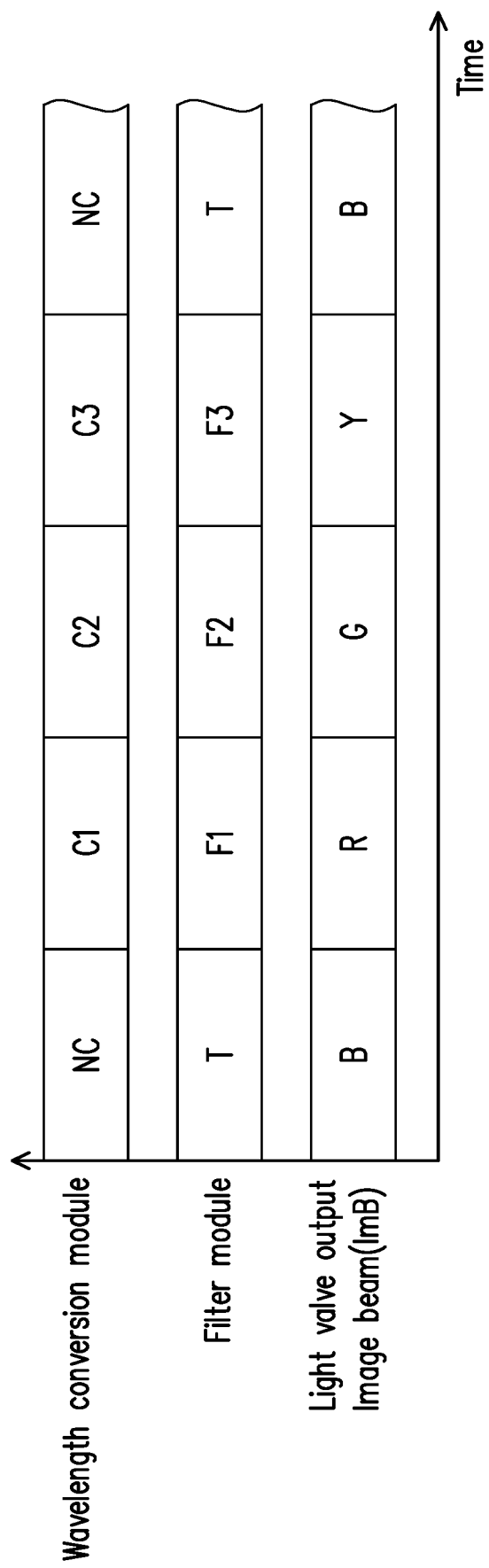
FIG. 7 is a time sequence diagram showing that a filter module, a wavelength conversion module, and a light valve are in synchronous operation according to another embodiment of the invention.

FIG. 1 is a schematic view of a projection apparatus according to an embodiment of the invention. FIGS. 2 and 3 are schematic views of optical paths of the illumination system of FIG. 1 in different time sequences. FIG. 4 is a schematic view of a filter module of FIG. 1. FIGS. 5A and 5B are respectively a schematic side view and a schematic front view of a wavelength conversion module of FIG. 1. FIG. 6 is a schematic view of a wavelength conversion module according to another embodiment of the invention. FIG. 7 is a time sequence diagram showing that a filter module, a wavelength conversion module, and a light valve are in synchronous operation according to another embodiment of the invention.

Referring to FIGS. 1, 2 and 3, a projection apparatus 10 includes an illumination system 100, a light valve 200, and a projection lens 300. The illumination system 100 is configured to provide an illumination beam IB. The illumination beam IB includes an excitation beam EB1 (FIG. 2), an excitation beam EB2 of FIG. 2, and a conversion beam CB of FIG. 3 sequentially. The light valve 200 is disposed on a transmission path of the illumination beam IB from the illumination system 100 and is configured to convert the illumination beam IB into an image beam ImB. The projection lens 300 is disposed on the transmission path of the illumination beam IB from the light valve 200 to project the image beam ImB onto a screen, a wall, or other objects that can be used for forming an image.

In some embodiments, the light valve 200 may be a digital micro-mirror device (DMD), a liquid-crystal-on-silicon (LCOS) panel, or a transmissive liquid crystal panel. However, the invention is not limited thereto.

In some embodiments, the projection lens 300 may include, for example, a combination of one or more optical lenses with identical or different diopters, such as a biconcave lens, a biconvex lens, a concave-convex lens, a convex-concave lens, a plano-convex lens, a plano-concave lens, and various combinations thereof. In another aspect, the projection lens 300 may also include a planar optical lens. The invention may not limit the form and type of the projection lens 300.

In some embodiments, the illumination system 100 includes an excitation light source module 110, a light splitting and combining module 120, a filter module 130, and a wavelength conversion module 140. The excitation light source module 110 is configured to provide at least one excitation beam. In the embodiment, the excitation light source module 110 further includes a first excitation light source 111 and a second excitation light source 112. Moreover, the emission wavelength of the first excitation light source 111 may be different from the emission wavelength of the second excitation light source 112. For example, the first excitation light source 111 is configured to provide the first excitation beam EB1, and the second excitation light source 112 is configured to provide the second excitation beam EB2. Moreover, the first excitation beam EB1 and the second excitation beam EB2 may have different wavelength ranges from each other. However, the invention is not limited thereto. In the embodiment, the first excitation light source 111 and the second excitation light source 112 are each, for example, a laser diode, a light emitting diode, or a combination of the above. However, the invention is not limited thereto.

In some embodiments, the light splitting and combining module 120 is disposed on a transmission path of the at least one excitation beam from the excitation light source module 110. In the embodiment, the light splitting and combining module 120 includes a first optical film 121, a second optical film 122, and a substrate 123. The first optical film 121 and the second optical film 122 are juxtaposed on the substrate 123. The substrate 123 here is, for example, a glass substrate, a quartz substrate, or other suitable light transmitting substrate. For example, the first optical film 121 may be disposed on a transmission path of the first excitation beam EB1 radiated from the first excitation light source 111. For example, the second optical film 122 may be disposed on a transmission path of the second excitation beam EB2 radiated from the second excitation light source 112.

Furthermore, the first optical film 121 may allow the first excitation beam EB1 to pass there-through and may reflect the second excitation beam EB2. The second optical film 122 may allow the second excitation beam EB2 to pass there-through and may reflect the first excitation beam EB1. For example, the first excitation light source 111 may include a blue laser diode and emit a beam with a dominant wavelength of, for example, 465 nm. The second excitation light source 112 may include a blue laser diode and emit a beam with a dominant wavelength of, for example, 455 nm. In the above embodiment, the first optical film 121 may allow the first excitation beam EB1 with the dominant wavelength of 465 nm to pass there-through and reflect the second excitation beam EB2 with the dominant wavelength of 455 nm. The second optical film 122 may allow the second excitation beam EB2 with the dominant wavelength of 455 nm to pass there-through and reflect the first excitation beam EB1 with the dominant wavelength of 465 nm.

Referring to FIG. 4, the filter module 130 is disposed on the transmission path of the at least one excitation beam (e.g. the first excitation beam EB1 and the second excitation beam EB2) from the light splitting and combining module 120. The filter module 130 may include a light passing area T configured to allow the excitation beam to pass there-through and may include at least one light filtering area F configured to reflect the excitation beam. Note that a diffuser may be disposed or a diffusion structure may be formed in the light passing area T of the filter module 130, so as to reduce laser speckles effectively. In the embodiment, the filter module 130 may include three light filtering areas F, namely a first light filtering area F1, a second light filtering area F2, and a third light filtering area F3. However, the invention is not limited thereto. Specifically, as shown in FIG. 4, the first light filtering area F1, the second light filtering area F2, and the third light filtering area F3 may each be provided with a filter which allows a beam with a specific color (or wavelength) to pass there-through and reflects or absorbs beams with other colors (or wavelengths). For example, the light passing area T, the first light filtering area F1, the second light filtering area F2, and the third light filtering area F3 may respectively allow a blue beam, a red beam, a green beam, and a yellow beam to pass there-through. However, the invention is not limited to the disclosure of the drawings. In other embodiments, the number of the light filtering areas F of the filter module, the color of each light filtering area F, and the arrangement of a plurality of light filtering areas F may be adjusted according to actual design needs.

In the embodiment, the filter module 130 is, for example, a combination of a filter wheel and a rotating mechanism (not shown). The rotating mechanism (e.g. a motor) is configured to drive the filter wheel to rotate around a rotation axis RA so that a plurality of areas of the filter module 130 may sequentially enter the transmission path of the excitation beam from the light splitting and combining module 120. However the invention is not limited thereto. In other embodiments, the plurality of areas of the filter module may enter the transmission path of the excitation beam by other means based on actual requirements. For example, the plurality of areas of the filter module may be translated in a single direction so as to sequentially enter the transmission path of the excitation beam.

In some embodiments, when the light passing area T of the filter module 130 enters the transmission path of the excitation beam (e.g. the first excitation beam EB1 and the second excitation beam EB2), the excitation beam may pass through the filter module 130 (as shown in FIG. 2). When the light filtering area F of the filter module 130 enters the transmission path of the excitation beam from the light splitting and combining module 120, the excitation beam is reflected by the light filtering area F of the filter module 130 (as shown in FIG. 3). Furthermore, the first excitation beam EB1 from the first optical film 121 is reflected by the light filtering area F of the filter module 130, then transmitted to the second optical film 122 of the light splitting and combining module 120 and then reflected by the second optical film 122. The second excitation beam EB2 from the second optical film 122 is reflected by the light filtering area F of the filter module 130, then transmitted to the first optical film 121 of the light splitting and combining module 120 and then reflected by the first optical film 121.

In some embodiments, the wavelength conversion module 140 is disposed on the transmission path of the at least one excitation beam (e.g. the first excitation beam EB1 and the second excitation beam EB2) reflected by the filter module 130 and is configured to convert the at least one excitation beam reflected by the filter module 130 into a conversion beam CB. The wavelength conversion module 140 may reflect the conversion beam CB so that the conversion beam CB is transmitted toward the light filtering area F of the filter module 130. As shown in FIGS. 5A and 5B, the wavelength conversion module 140 may include a carrier plate 141 and a wavelength conversion layer 142. In the embodiment, the carrier plate 141 is capable of reflecting light beams and thus the conversion beam CB can be reflected back to the light splitting and combining module 120. For example, the carrier plate 141 may be a metal carrier plate. Therefore, the carrier plate 141 further contributes to a better heat dissipation. Alternatively, the carrier plate 141 may be a light transmitting carrier plate and a reflection layer may be formed on a surface 141s of the carrier plate 141 facing the light splitting and combining module 120.

In a further embodiment, the wavelength conversion layer 142 is disposed on the surface 141s of the carrier plate 141 facing the light splitting and combining module 120 and is configured to absorb a short wavelength beam (e.g. the excitation beam) and excite a long wavelength beam (e.g. the conversion beam CB). In the embodiment, the wavelength conversion layer 142 may be arranged along the circumference of the carrier plate 141. However, the invention is not limited thereto. The material of the wavelength conversion layer 142 may include a phosphor material, quantum dots, or a combination of the two aforementioned materials. In particular, the material of the wavelength conversion layer 142 may optionally further include light scattering particles to improve conversion efficiency.

In the embodiment, the wavelength conversion module 140 is, for example, a combination of a phosphor wheel and a rotating mechanism (not shown). The rotating mechanism (e.g. a motor) is configured to drive the phosphor wheel to rotate around a rotation axis RA' so as to improve the heat dissipation effect of the wavelength conversion module 140. However, the invention is not limited thereto. According to other embodiments, the wavelength conversion module may not rotate.

In the embodiment, the excitation beam from the excitation light source module 110 may be transmitted to the light splitting and combining module 120 rather than to the wavelength conversion module 140, and then further to the filter module 130. The excitation beam may be output from the filter module 130 via the light passing area T of the filter module 130. Accordingly, in the embodiment, when the wavelength conversion module 140 rotates around the rotation axis RA', the wavelength conversion module 140 is less likely to wobble and this contributes to an improvement in stability of the transmission paths of the excitation beam and the conversion beam CB.

Referring to FIG. 3, the first optical film 121 and the second optical film 122 of the light splitting and combining module 120 may also reflect the conversion beam CB. For example, a part of the conversion beam CB from the wavelength conversion module 140 is reflected by the first optical film 121 and is transmitted toward the light filtering area F of the filter module 130. Another part of the conversion beam CB from the wavelength conversion module 140 is reflected by the second optical film 122 and is transmitted toward the light filtering area F of the filter module 130. In other words, the first optical film 121 of the light splitting and combining module 120 may reflect the second excitation beam EB2 (e.g. the excitation beam with a dominant wavelength of 455 nm) and may also reflect the conversion beam CB from the wavelength conversion module 140. The second optical film 122 may reflect the first excitation beam EB1 (e.g. the excitation beam with a dominant wavelength of 465 nm) and may also reflect the conversion beam CB from the wavelength conversion module 140.

Note that, referring to FIG. 2, when the light passing area T of the filter module 130 enters the transmission path of the excitation beam (e.g. the first excitation beam EB1 and the second excitation beam EB2) from the light splitting and combining module 120, the excitation beam may be transmitted through the light passing area T of the filter module 130 and be output. As shown in FIG. 3, when the light filtering area F (e.g. the first light filtering area F1, the second light filtering area F2, or the third light filtering area F3) of the filter module 130 enters the transmission path of the excitation beam from the light splitting and combining module 120 by sequence, the first excitation beam EB1 passing through the first optical film 121 is reflected by the light filtering area F, then reflected by the second optical film 122 and transmitted to the wavelength conversion module 140. Similarly, the second excitation beam EB2 passing through the second optical film 122 is reflected by the light filtering area F, then reflected by the first optical film 121 and transmitted to the wavelength conversion module 140. The first excitation beam EB1 and the second excitation beam EB2 are incident to the wavelength conversion module 140 so that the conversion beam CB is generated from the wavelength conversion module 140. The conversion beam CB is then reflected by an optical film (the first optical film 121 and the second optical film 122) of the light splitting and combining module 120 and is transmitted toward the light filtering area F of the filter module 130. More specifically, the illumination beam IB (as shown in FIG. 1) radiated from the illumination system 100 includes the excitation beam shown in FIG. 2 that passes through the light passing area T and further includes the conversion beam CB shown in FIG. 3 that passes through a plurality of light filtering areas F.

In detail, in the embodiment, the wavelength conversion module 140 converts the excitation beam (e.g. the first excitation beam EB1 and the second excitation beam EB2) of blue color into the conversion beam CB of yellow color. The conversion beam CB of yellow color is then filtered by a plurality of light filtering areas F (as shown in FIG. 4) of the filter module 130, and beams of various colors (e.g. red light, green light, and yellow light) for illumination are sequentially output. In other words, as shown in FIGS. 5A and 5B, in the embodiment, it is possible to dispose merely one wavelength conversion material (e.g. a wavelength conversion material for conversion into yellow light) on the carrier plate 141 of the wavelength conversion module 140 to avoid dividing the wavelength conversion layer 142 into a plurality of wavelength conversion areas provided with different wavelength conversion materials. In such a configuration (i.e. the wavelength conversion module has a single wavelength conversion layer), the wavelength conversion module 140 may have a more uniform mass distribution, and is therefore less likely to wobble, which contributes to an improvement in stability of the transmission paths of the excitation beam and the conversion beam CB. Furthermore, the filter module 130 and the wavelength conversion module 140 may rotate asynchronously.

However, the invention is not limited thereto. In another embodiment, a variety of different wavelength conversion materials may be disposed on the carrier plate 141 of a wavelength conversion module 140A to output beams of various colors. Referring to FIG. 6, for example, a wavelength conversion layer 142A of the wavelength conversion module 140A may be divided into a plurality of wavelength conversion areas (e.g. a first wavelength conversion area C1, a second wavelength conversion area C2, and a third wavelength conversion C3 as shown in FIG. 6) corresponding to a plurality of light filtering areas F (e.g. the first light filtering area F1, the second light filtering F2, or the third light filtering area F3) of the filter module 130, each of the wavelength conversion areas being provided with a different wavelength conversion material. In other embodiments, the wavelength conversion module 140A may also be provided with a non-conversion area NC corresponding to the light passing area T of the filter module 130 (as shown in FIG. 4). The non-conversion area NC does not receive an excitation beam.

As shown in FIGS. 6 and 7, in another embodiment, the filter module 130 and the wavelength conversion module 140A may be rotated synchronously. For example, positions of the non-conversion area NC, the first wavelength conversion C1, the second wavelength conversion C2, and the third wavelength conversion C3 of the wavelength conversion module 140A may respectively correspond to positions of the light passing area T, the first light filtering area F1, the second light filtering area F2, and the third light filtering area F3 of the filter module 130. Furthermore, the light valve may sequentially convert the excitation beam or a plurality of conversion beams into an image beam.

Referring to FIGS. 1, 2, and 3, in the embodiment, based on various requirements, the illumination system 100 may optionally include other elements. For example, the illumination system 100 may further include a light homogenizing element 150. The light homogenizing element 150 is disposed on a transmission path of a beam output from the filter module 130 to improve the uniformity of the beam. In the embodiment, the light homogenizing element 150 is, for example but not limited to, an optical integrator rod. In addition, the illumination system 100 may further include a first lens module 160 and a second lens module 170. The first lens module 160 is disposed between the light splitting and combining module 120 and the filter module 130. The first lens module 160 is disposed on the transmission path of the at least one excitation beam (e.g. the first excitation beam EB1 and the second excitation beam EB2) from the light splitting and combining module 120 and is configured to focus the at least one excitation beam from the light splitting and combining module 120 on or near the filter module 130 (e.g. within a distance of 5 mm (e.g., +/−0.5 mm) from the filter module 130).

For example, as shown in FIG. 2, the first excitation beam EB1 from the first optical film 121 and the second excitation beam EB2 from the second optical film 122, after passing through the first lens module 160, are incident to the filter module 130 along different directions, respectively. More specifically, the first lens module 160 has an optical axis AX. In addition, an optical path of the first excitation beam EB1 from the first optical film 121 of the light splitting and combining module 120 and an optical path of the second excitation beam EB2 from the second optical film 122 of the light splitting and combining module 120 are respectively located on two opposite sides of the optical axis AX of the first lens module 160. The first excitation beam EB1, after passing through the first lens module 160, is incident to the filter module 130 along a first direction (i.e. an extension direction of the optical path of the first excitation beam EB1). The second excitation beam EB2, after passing through the first lens module 160, is incident to the filter module 130 along a second direction (i.e. an extension direction of the optical path of the second excitation beam EB2). In the embodiment, an included angle θ1 between the first direction and the optical axis AX is approximately equal to an included angle θ2 between the second direction and the optical axis AX. Both the included angle θ1 and the included angle θ2 are acute angles, but the invention is not limited thereto.

Since the first excitation beam EB1 and the second excitation beam EB2 from the light splitting and combining module 120 are respectively located on two opposite sides of the optical axis AX of the first lens module 160 and are incident to the filter module 130 along different directions, the excitation beam, after passing through the light passing area T of the filter module 130, may be incident to the light homogenizing element 150 at a preset angle range. This contributes to an improvement in the overall uniformity of the excitation beam emitted from the light homogenizing element 150. In addition, since the excitation beam (e.g. the first excitation beam EB1 and the second excitation beam EB2 in FIG. 2) passing through the light passing area T of the filter module 130 does not pass through the wavelength conversion module 140, it is not necessary to provide a reflective element in the wavelength conversion module 140 (e.g. on the carrier plate 141). Accordingly, the wavelength conversion module 140 can be prevented from wobbling (which may cause a light loss when a beam is incident to the light homogenizing element 150) when being rotated around the rotation axis RA'. The so-called "wobbling" may refer to vertical swinging of the wavelength conversion module 140 about the rotation axis RA' at an edge of the wavelength conversion module 140 due to an uneven weight distribution during rotation of the wavelength conversion module 140. The wobbling of the wavelength conversion module 140 may cause a change in area of speckles where the excitation beam is irradiated to the wavelength conversion module 140, with the results that a part of the excitation beam is not incident to the light homogenizing element 150 and that a light loss occurs.

In other words, in the above arrangement of the first excitation beam EB1 and the second excitation beam EB2 from the light splitting and combining module 120, the stability of the transmission paths of the excitation beam and the conversion beam CB and the light use efficiency of the projection apparatus 10 can be effectively improved.

In another aspect, the second lens module 170 is disposed between the light splitting and combining module 120 and the wavelength conversion module 140. The second lens module 170 is disposed on the transmission path of the excitation beam reflected by an optical film of the light splitting and combining module 120 and is configured to focus the excitation beam on the wavelength conversion module 140. In the embodiment, the second lens module 170 may further include a lens 171 and a lens 172. In a further embodiment, the lens 171 and the lens 172 may be disposed on the transmission path of the conversion beam CB to converge the conversion beam CB which is transmitted from the wavelength conversion module 140. It is noted that the invention is not limited to the disclosure of the drawings. In other embodiments, the numbers of the first lens module and the second lens module and the number of the lenses of the illumination system may be adjusted as required.

Some other embodiments are mentioned below to describe the invention in further detail, the same components may be marked by the same or similar reference numerals, and the description of the same technical content may be omitted. The omitted content may be understood with reference to the foregoing embodiments and will not be repeated below.

Figure 8:
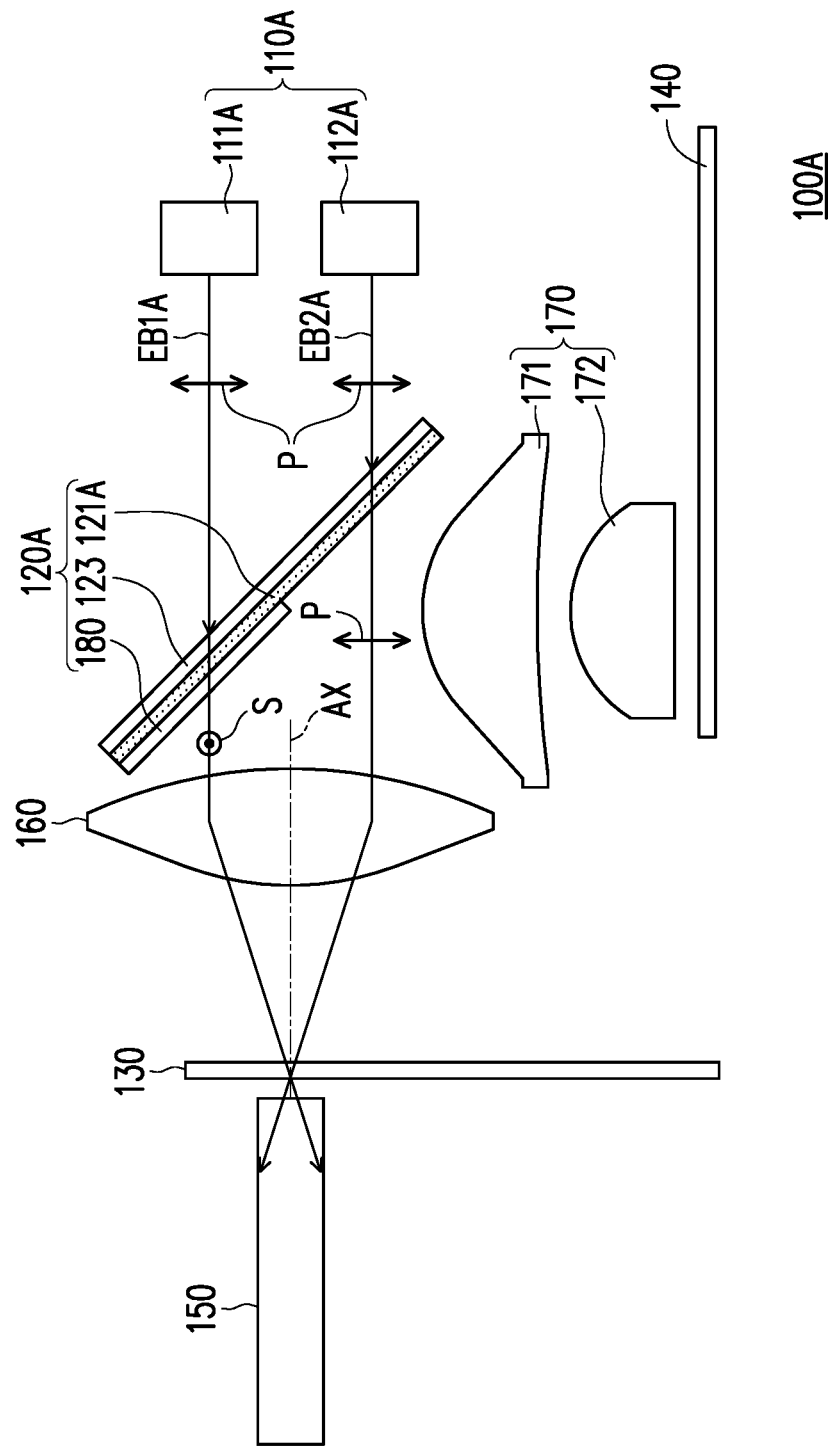
FIGS. 8 and 9 are respectively schematic views of optical paths of an illumination system in different time sequences according to still another embodiment of the invention.
Figure 9:
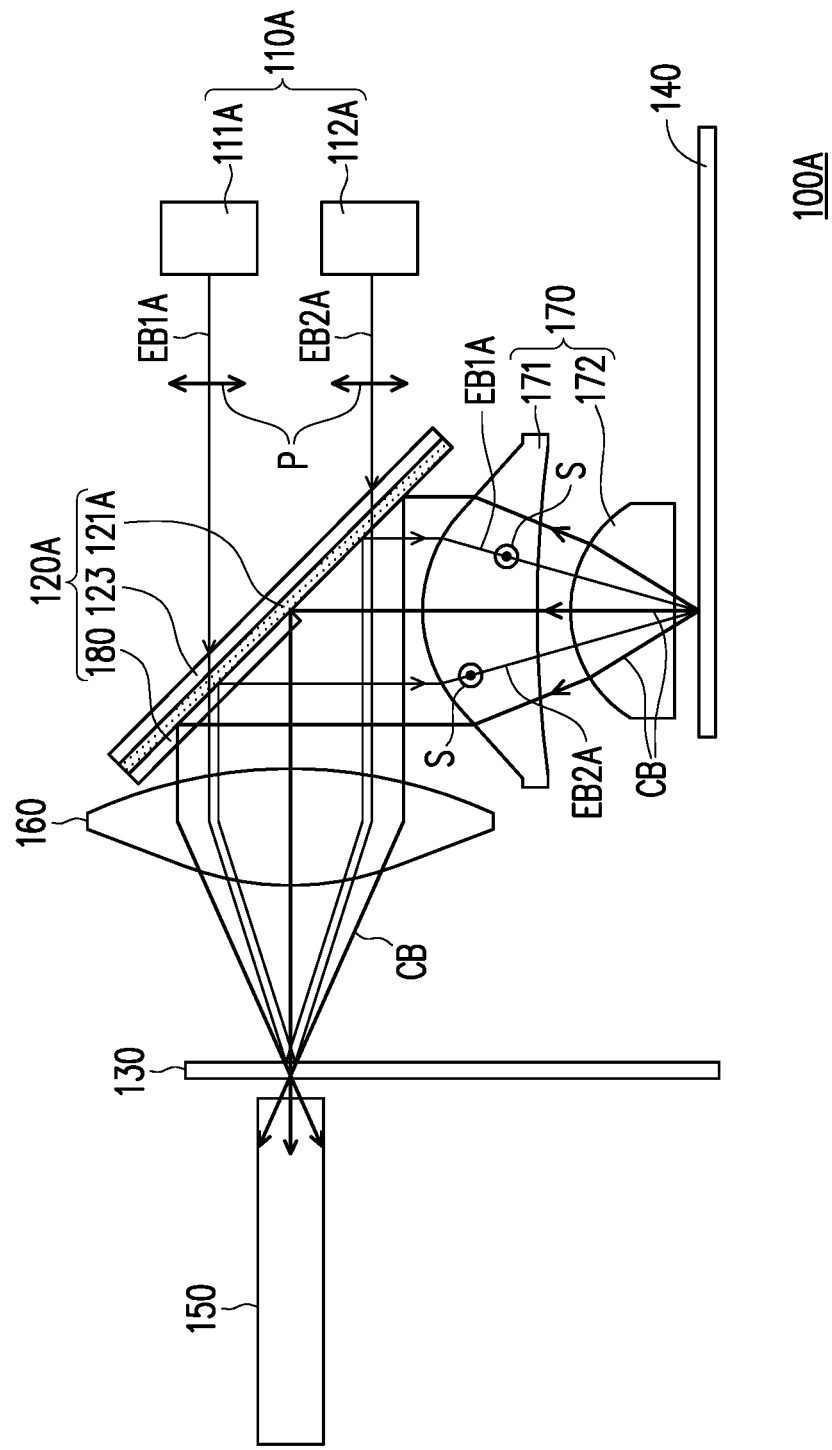

FIGS. 8 and 9 are respectively schematic views of optical paths of an illumination system in different time sequences according to still another embodiment of the invention. Referring to FIGS. 8 and 9, a main difference between an illumination system 100A of the embodiment and the illumination system 100 of FIGS. 2 and 3 is that the light splitting and combining module or the excitation light source module has a different composition or configuration.

In the embodiment, an excitation light source module 110A includes a first excitation light source 111A and a second excitation light source 112A. Moreover, a first excitation beam EB1A radiated from the first excitation light source 111A and a second excitation beam EB2A radiated from the second excitation light source 112A may have the same emission wavelength (e.g. a dominant wavelength of 455 nm). However, the first excitation beam EB1A from the first excitation light source 111A and the second first excitation beam EB2A from the second excitation light source 112A are different in polarization state after passing through a light splitting and combining module 120A. Furthermore, the first excitation beam EB1A and the second excitation beam EB2A have the same polarization state (e.g. a first polarization state P) before passing through the light splitting and combining module 120A, and have different polarization states (e.g. the first polarization state P and a second polarization state S, respectively) after passing through the light splitting and combining module 120A. It is noted that, in the embodiment, when a beam is described to have the first polarization state P, it means that in this beam, the intensity ratio of a sub-beam in the first polarization state P to another sub-beam in the second polarization state S is greater than 500:1, but the invention is not limited thereto.

Specifically, the light splitting and combining module 120A includes the substrate 123, a first optical film 121A disposed on the substrate 123, and a half-wave plate 180 disposed on the substrate 123. The first optical film 121A is disposed on the transmission path of the first excitation beam EB1A and the second excitation beam EB2A from the excitation light source module 110A. The half-wave plate 180 is disposed on the transmission path of the first excitation beam EB1A from the first excitation light source 111A and outside the transmission path of the second excitation beam EB2A. Note that the half-wave plate 180 may be located on one side of the first optical film 121A facing away from the excitation light source module 110A and is configured to convert the excitation beam (e.g. the first excitation beam EB1A) having the first polarization state P into an excitation beam having the second polarization state S. The first optical film 121A is disposed between the substrate 123 and the half-wave plate 180.

In the embodiment, the first excitation beam EB1A from the first optical film 121A and the half-wave plate 180 and the second excitation beam EB2A from the first optical film 121A, after passing the first lens module 160, are respectively incident to the filter module 130 along different directions. More specifically, the first lens module 160 has the optical axis AX. In addition, after passing through the light splitting and combining module 120A, the first excitation beam EB1A and the second excitation beam EB2A have optical paths respectively located on two opposite sides of the optical axis AX of the first lens module 160. For example, the first excitation beam EB1A, after passing through the first lens module 160, may be incident to the filter module 130 along a first direction (i.e. an extension direction of the optical path of the first excitation beam EB1A). The second excitation beam EB2A, after passing through the first lens module 160, may be incident to the filter module 130 along a second direction (i.e. an extension direction of the optical path of the second excitation beam EB2A). Since the first excitation beam EB1A and the second excitation beam EB2A from the light splitting and combining module 120A are respectively located on two opposite sides of the optical axis AX of the first lens module 160, and are incident to the filter module 130 along different directions, the excitation beam, after passing through the light passing area T of the filter module 130, is incident to the light homogenizing element 150 at a preset angle range, which contributes to an improvement in the overall uniformity of the excitation beam emitted from the light homogenizing element 150.

In the embodiment, as shown in FIG. 9, the first optical film 121A allows the excitation beam having the first polarization state P to pass there-through and reflects the excitation beam having the second polarization state S. For example, the first excitation beam EB1A from the first excitation light source 111A and having the first polarization state P may pass through the first optical film 121A. However, after the first excitation beam EB1A passes through the half-wave plate 180, the polarization state of the first excitation beam EB1A changes to, for example, the second polarization state S, and the first excitation beam EB1A is further transmitted to the filter module 130. Furthermore, the first excitation beam EB1A having the second polarization state S may be reflected by at least one light filtering area of the filter module 130, and then reflected by the first optical film 121A and transmitted toward the wavelength conversion module 140. In the embodiment, the second excitation beam EB2A from the second excitation light source 112A and having the first polarization state P may pass through the first optical film 121A and then be transmitted to the filter module 130. The second excitation beam EB2A having the first polarization state P may be reflected by at least one light filtering area of the filter module 130. Then, after the second excitation beam EB2A passes through the half-wave plate 180, the polarization state of the second excitation beam EB2A changes to, for example, the second polarization state S. Then, the second excitation beam EB2A having the second polarization state S may be reflected by the first optical film 121A and transmitted toward the wavelength conversion module 140.

Furthermore, the first optical film 121A may reflect the conversion beam CB. For example, the conversion beam CB from the wavelength conversion module 140 is reflected by the first optical film 121A and transmitted toward the filter module 130. Note that by the aforementioned configuration of utilizing the light splitting and combining module 120A together with the excitation light source having polarization characteristics, the excitation light source can be simplified in type or number. In an embodiment not shown, the excitation light source module may be provided with merely one excitation light source, and the excitation beam from this excitation light source, after passing through a light splitting and combining module, forms a first excitation beam and a second excitation beam which are different from each other in polarization state. Accordingly, design flexibility of the illumination system 100A may be increased.

Figure 10:
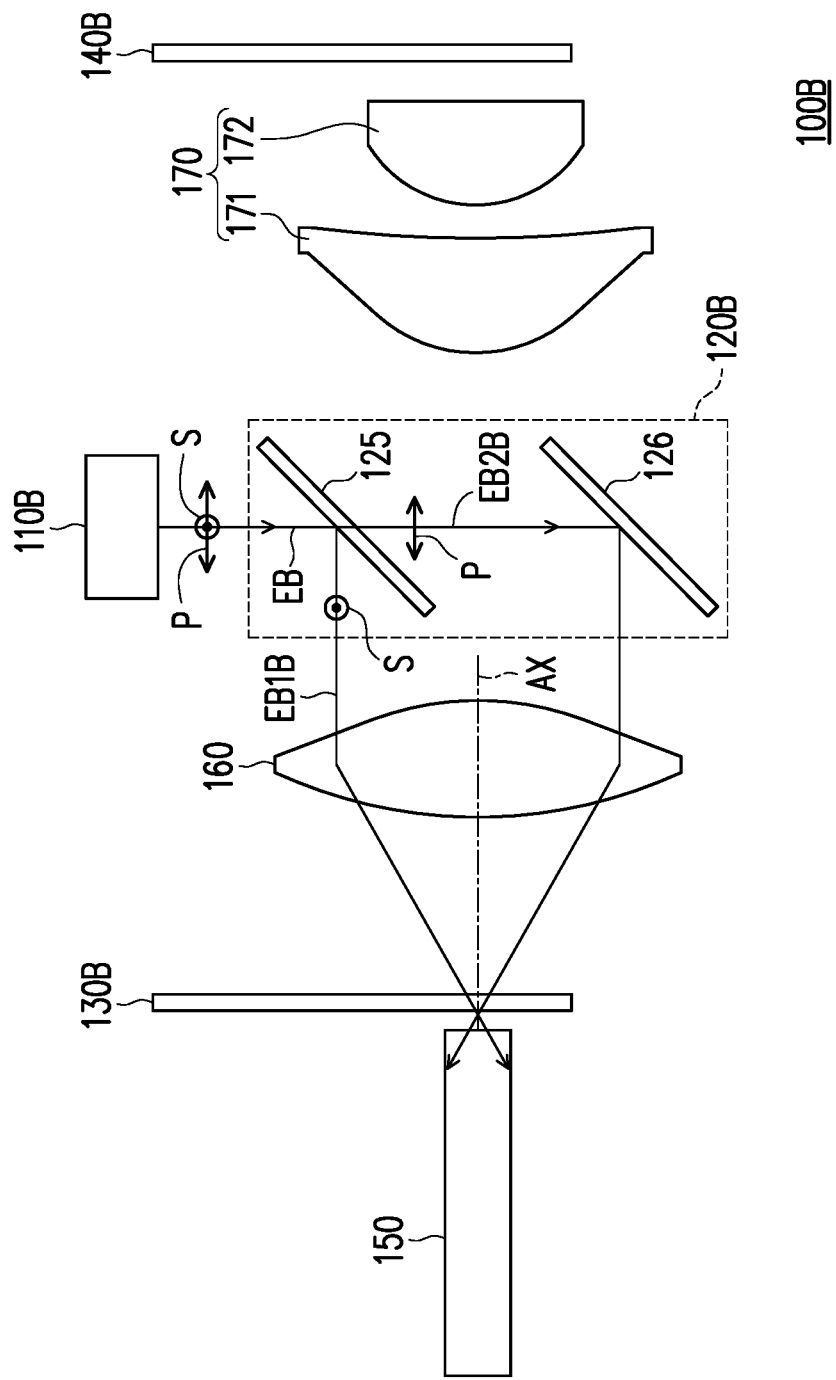
FIGS. 10 and 11 are respectively schematic views of optical paths of an illumination system in different time sequences according to yet still another embodiment of the invention.
Figure 11:
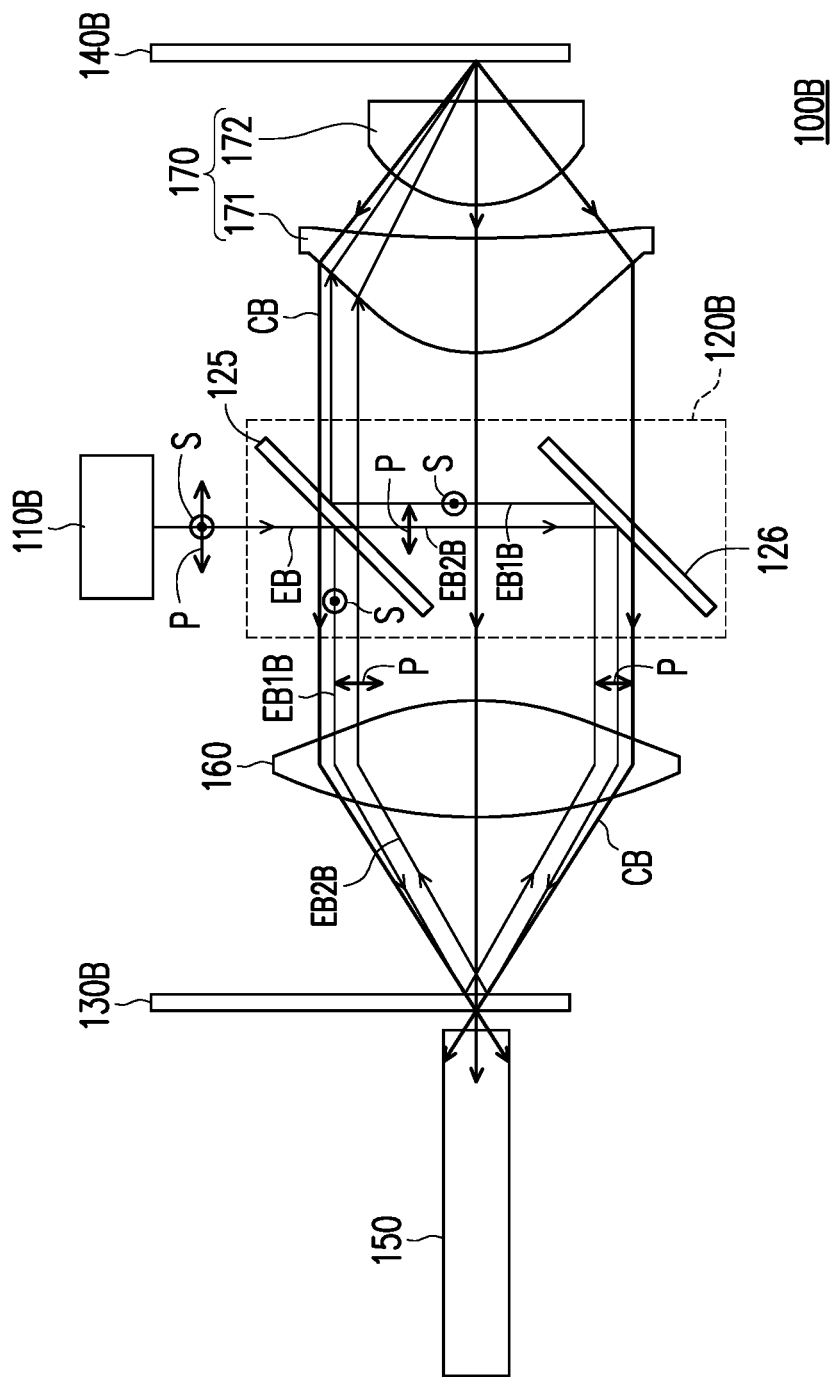
Figure 12:
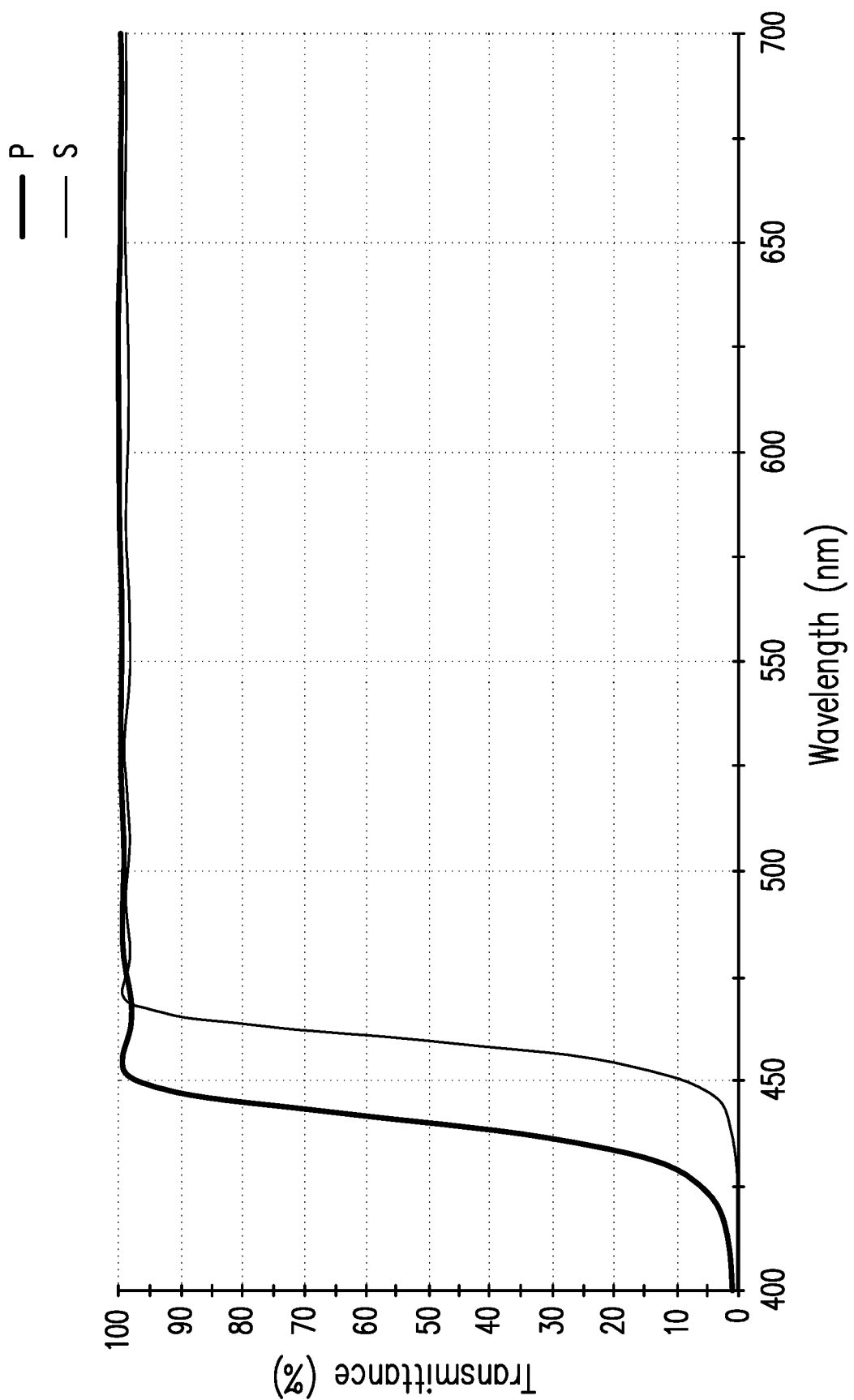
FIG. 12 is a curve diagram of transmittance of a polarization beam splitter of FIG. 10 with respect to beams of different wavelengths.

FIGS. 10 and 11 are respectively schematic views of optical paths of an illumination system in different time sequences according to yet still another embodiment of the invention. FIG. 12 is a curve diagram of transmittance of a polarization beam splitter of FIG. 10 with respect to beams of different wavelengths. Referring to FIGS. 10 and 11, a main difference between an illumination system 100B of the embodiment and the illumination system 100 of FIGS. 2 and 3 is that the excitation light source module and the light splitting and combining module have different compositions and configurations.

In the embodiment, an excitation light source module 110B may provide a beam with a polarization ratio of about 1:1. To be more specific, among laser beams provided by the excitation light source module 110B (e.g. semiconductor laser), the intensity ratio between a sub-beam in the first polarization state P and another sub-beam in the second polarization state S is about 1:1. However, the invention is not limited thereto.

In the embodiment, the light splitting and combining module 120B includes a polarization beam splitter 125 and a wavelength beam splitter 126. The polarization beam splitter 125 is disposed on a transmission path of an excitation beam EB from the excitation light source module 110B, and a part (e.g. a beam having the polarization state S) of the excitation beam EB is reflected by the polarization beam splitter 125 and forms a first excitation beam EB1B. Another part (e.g. a beam having the polarization state P) of the excitation beam EB may pass through the polarization beam splitter 125 and form a second excitation beam EB2B. Note that the polarization state (e.g. the second polarization state S) of the first excitation beam EB1B reflected by the polarization beam splitter 125 is different from the polarization state (e.g. the first polarization state P) of the second excitation beam EB2B passing through the polarization beam splitter 125.

In the embodiment, the polarization beam splitter 125 has different transmittances with respect to the excitation beam in the first polarization state P and the excitation beam in the second polarization state S. For example, the excitation light source module 110B may be a blue laser with a dominant wavelength of 450 nm, and the polarization beam splitter 125 allows a part of the excitation beam EB having the first polarization state P to pass there-through and reflects another part of the excitation beam EB having the second polarization state S (as shown in FIG. 12). The wavelength beam splitter 126 is disposed on a transmission path of the second excitation beam EB2B from the polarization beam splitter 125. In the embodiment, the wavelength beam splitter 126 allows the conversion beam CB from a wavelength conversion module 140B to pass there-through, and reflects the second excitation beam EB2B from the polarization beam splitter 125 and the first excitation beam EB1B (having the second polarization state S) reflected by a light filtering area of the filter module 130B.

Specifically, the first excitation beam EB1B from the polarization beam splitter 125 is reflected by the light filtering area of the filter module 130B, the wavelength beam splitter 126, and the polarization beam splitter 125 sequentially. The first excitation beam EB1B is then transmitted toward the wavelength conversion module 140B. In addition, the second excitation beam EB2B from the polarization beam splitter 126 is reflected by the light filtering area of the filter module 130B, passes through the wavelength beam splitter 125, and is then transmitted toward the wavelength conversion module 140B. In another aspect, the conversion beam CB from the wavelength conversion module 140B, after being transmitted through the light splitting and combining module 120B, is transmitted toward the filter module 130B. More specifically, both the polarization beam splitter 125 and the wavelength beam splitter 126 of the embodiment allow the conversion beam CB from the wavelength conversion module 140B to pass there-through (as shown in FIG. 11).

In the embodiment, the first excitation beam EB1B from the polarization beam splitter 125 and the second excitation beam EB2B from the wavelength beam splitter 126, after passing through the first lens module 160, are respectively incident to the filter module 130 along different directions. More specifically, the first lens module 160 has the optical axis AX. In addition, an optical path of the first excitation beam EB1B from the polarization beam splitter 125 and an optical path of the second excitation beam EB2B from the wavelength beam splitter 126 are respectively located on two opposite sides of the optical axis AX of the first lens module 160. The first excitation beam EB1B, after passing through the first lens module 160, is incident to the filter module 130 along a first direction (i.e. an extension direction of the optical path of the first excitation beam EB1B). The second excitation beam EB2B, after passing through the first lens module 160, is incident to the filter module 130B along a second direction (i.e. an extension direction of the optical path of the second excitation beam EB2B). Since the first excitation beam EB1B and the second excitation beam EB2B from the light splitting and combining module 120B are respectively located on two opposite sides of the optical axis AX of the first lens module 160 and are incident to the filter module 130B along different directions, the excitation beam, after passing through the light passing area of the filter module 130B, is incident to the light homogenizing element 150 at a preset angle range. This contributes to an improvement in the overall uniformity of the excitation beam emitted from the light homogenizing element 150. Note that, in the embodiment, by the cooperation between the polarization beam splitter 125 and the wavelength beam splitter 126, the configuration of the excitation light source module 110B can be simplified, which contributes to an improvement in design flexibility of the illumination system 100B.

To sum up, in the illumination system and the projection apparatus of the embodiments of the invention, the excitation light source module provides at least one excitation beam. The excitation beam, after passing through the light splitting and combining module, forms at least two excitation beams which are different from each other in polarization state or different wavelength range. The excitation beam, after passing through the light passing area of the filter module, forms a part of the illumination beam, and the part of illumination beam is improved in uniformity. In another aspect, since there is no need to transmit the two excitation beams to the wavelength conversion module, their transmission path is improved in stability, which contributes to an improvement in light use efficiency of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising an excitation light source module, a light splitting and combining module, a filter module, a first lens module, and a wavelength conversion module, wherein
the excitation light source module is configured to provide at least one excitation beam;
the light splitting and combining module is disposed on a transmission path of the at least one excitation beam from the excitation light source module, wherein the at least one excitation beam from the light splitting and combining module comprises a first excitation beam and a second excitation beam, and the first excitation beam and the second excitation beam are different from each other in polarization state or wavelength range;
the filter module is disposed on the transmission path of the at least one excitation beam from the light splitting and combining module, wherein the filter module includes a light passing area configured to allow the at least one excitation beam to pass there-through and at least one light filtering area configured to reflect the at least one excitation beam;
the first lens module is disposed on the transmission path of the at least one excitation beam from the light splitting and combining module and configured to focus the at least one excitation beam from the light splitting and combining module on the filter module, wherein the first excitation beam from the first lens module is incident to the filter module along a first direction, and the second excitation beam from the first lens module is incident to the filter module along a second direction, wherein the first direction and the second direction are located on two opposite sides of an optical axis of the first lens module; and
the wavelength conversion module is disposed on the transmission path of the at least one excitation beam reflected by the at least one light filtering area, the wavelength conversion module is configured to convert the at least one excitation beam reflected by the at least one light filtering area into a conversion beam and reflect the conversion beam so that the conversion beam is transmitted toward the at least one light filtering area, the at least one excitation beam passing through the light passing area and the conversion beam passing through the at least one light filtering area form an illumination beam, when the light passing area of the filter module enters the transmission path of the first excitation beam and the second excitation beam from the light splitting and combining module, optical paths of the first excitation beam and the second excitation beam extending from the excitation light source to the filter module do not pass through the wavelength conversion module, and the first excitation beam and the second excitation beam are respectively incident to the light passing area of the filter module from two opposite sides of the optical axis of the first lens module.

2. The illumination system according to claim 1, wherein the excitation light source module comprises a first excitation light source and a second excitation light source, the first excitation light source is configured to provide the first excitation beam, the second excitation light source is configured to provide the second excitation beam, and an emission wavelength of the first excitation light source is different from an emission wavelength of the second excitation light source.

3. The illumination system according to claim 2, wherein the light splitting and combining module comprises a first optical film and a second optical film, wherein,
the first optical film is disposed on the transmission path of the first excitation beam from the first excitation light source, allows the first excitation beam to pass there-through and reflects the second excitation beam, wherein the second excitation beam, after being reflected by the at least one light filtering area, is reflected by the first optical film and transmitted toward the wavelength conversion module; and
the second optical film is disposed on the transmission path of the second excitation beam from the second excitation light source, allows the second excitation beam to pass there-through and reflects the first excitation beam, wherein the first excitation beam, after being reflected by the at least one light filtering area, is reflected by the second optical film and transmitted toward the wavelength conversion module.

4. The illumination system according to claim 3, wherein the conversion beam from the wavelength conversion module is reflected by the first optical film and the second optical film and transmitted toward the filter module.

5. The illumination system according to claim 1, wherein the excitation light source module comprises a first excitation light source and a second excitation light source, the first excitation light source is configured to provide the first excitation beam, and the second excitation light source is configured to provide the second excitation beam, wherein the first excitation beam and the second excitation beam have a same polarization state before being incident to the light splitting and combining module and have different polarization states from each other after passing through the light splitting and combining module.

6. The illumination system according to claim 5, wherein the light splitting and combining module comprises a first optical film and a half-wave plate, wherein,
the first optical film is disposed on the transmission path of the at least one excitation beam from the excitation light source module; and
the half-wave plate is disposed on the transmission path of the first excitation beam from the first excitation light source, and is disposed outside the transmission path of the second excitation beam from the second excitation light source; wherein
the second excitation beam reflected by the at least one light filtering area is reflected by the first optical film and transmitted toward the wavelength conversion module, and the first excitation beam from the half-wave plate is reflected by the at least one light filtering area and the first optical film sequentially and transmitted toward the wavelength conversion module.

7. The illumination system according to claim 6, wherein the conversion beam from the wavelength conversion module is reflected by the first optical film and transmitted toward the filter module.

8. The illumination system according to claim 1, wherein the light splitting and combining module comprises a polarization beam splitter and a wavelength beam splitter, wherein
the polarization beam splitter is disposed on the transmission path of the at least one excitation beam from the excitation light source module, wherein a part of the at least one excitation beam from the excitation light source module is reflected by the polarization beam splitter and forms the first excitation beam, and wherein another part of the at least one excitation beam from the excitation light source module forms the second excitation beam after passing through the polarization beam splitter, and the polarization state of the first excitation beam is different from the polarization state of the second excitation beam; and the wavelength beam splitter is disposed on the transmission path of second excitation beam from the polarization beam splitter.

9. The illumination system according to claim 8, wherein the first excitation beam from the polarization beam splitter is reflected sequentially by the at least one light filtering area, the wavelength beam splitter, and the polarization beam splitter, and transmitted toward the wavelength conversion module, and the second excitation beam from the wavelength beam splitter is reflected by the at least one light filtering area, passes through the polarization beam splitter, and then is transmitted toward the wavelength conversion module.

10. The illumination system according to claim 9, wherein the conversion beam from the wavelength conversion module is transmitted toward the filter module after being transmitted through the light splitting and combining module.

11. A projection apparatus, comprising:
an illumination system comprising an excitation light source module, a light splitting and combining module, a filter module, a first lens module, and a wavelength conversion module, wherein the excitation light source module is configured to provide at least one excitation beam;

the light splitting and combining module is disposed on a transmission path of the at least one excitation beam from the excitation light source module, wherein the at least one excitation beam from the light splitting and combining module comprises a first excitation beam and a second excitation beam which are different from each other in polarization state or wavelength range;

the filter module is disposed on the transmission path of the at least one excitation beam from the light splitting and combining module, has a light passing area configured to allow the at least one excitation beam to pass there-through and at least one light filtering area configured to reflect the at least one excitation beam;

the first lens module is disposed on the transmission path of the at least one excitation beam from the light splitting and combining module and configured to focus the at least one excitation beam from the light splitting and combining module on the filter module, wherein the first excitation beam from the first lens module is incident to the filter module along a first direction, and the second excitation beam from the first lens module is incident to the filter module along a second direction, wherein the first direction and the second direction are located on two opposite sides of an optical axis of the first lens module;

the wavelength conversion module is disposed on the transmission path of the at least one excitation beam reflected by the at least one light filtering area and is configured to convert the at least one excitation beam reflected by the at least one light filtering area into a conversion beam and reflect the conversion beam so that the conversion beam is transmitted toward the at least one light filtering area, the at least one excitation beam passing through the light passing area and the conversion beam passing through the at least one light filtering area form an illumination beam, when the light passing area of the filter module enters the transmission path of the first excitation beam and the second excitation beam from the light splitting and combining module, optical paths of the first excitation beam and the second excitation beam extending from the excitation light source to the filter module do not pass through the wavelength conversion module, and the first excitation beam and the second excitation beam are respectively incident to the light passing area of the filter module from two opposite sides of the optical axis of the first lens module;

a light valve disposed on a transmission path of the illumination beam from the illumination system, and configured to convert the illumination beam into an image beam; and a projection lens disposed on a transmission path of the image beam from the light valve.

12. The projection apparatus according to claim 11, wherein the excitation light source module comprises a first excitation light source and a second excitation light source, the first excitation light source is configured to provide the first excitation beam, the second excitation light source is configured to provide the second excitation beam, and an emission wavelength of the first excitation light source is different from an emission wavelength of the second excitation light source.

13. The projection apparatus according to claim 12, wherein the light splitting and combining module comprises a first optical film and a second optical film, wherein the first optical film is disposed on the transmission path of the first excitation beam from the first excitation light source allows the first excitation beam to pass there-through and reflects the second excitation beam, wherein the second excitation beam, after being reflected by the at least one light filtering area, is reflected by the first optical film and transmitted toward the wavelength conversion module; and the second optical film is disposed on the transmission path of the second excitation beam from the second excitation light source, allows the second excitation beam to pass there-through and reflects the first excitation beam, wherein the first excitation beam, after being reflected by the at least one light filtering area, is reflected by the second optical film and transmitted toward the wavelength conversion module.

14. The projection apparatus according to claim 13, wherein the conversion beam from the wavelength conversion module is reflected by the first optical film and the second optical film and transmitted toward the filter module.

15. The projection apparatus according to claim 11, wherein the excitation light source module comprises a first excitation light source and a second excitation light source, the first excitation light source is configured to provide the first excitation beam, and the second excitation light source is configured to provide the second excitation beam, wherein the first excitation beam and the second excitation beam have a same polarization state before being incident to the light splitting and combining module and have different polarization states from each other after passing through the light splitting and combining module.

16. The projection apparatus according to claim 15, wherein the light splitting and combining module comprises a first optical film and a half-wave plate, wherein the first optical film is disposed on the transmission path of the at least one excitation beam from the excitation light source module; and the half-wave plate is disposed on the transmission path of the first excitation beam from the first excitation light source, and is disposed outside the transmission path of the second excitation beam from the second excitation light source; wherein the second excitation beam reflected by the at least one light filtering area is reflected by the first optical film and transmitted toward the wavelength conversion module, and the first excitation beam from the half-wave plate is reflected by the at least one light filtering area and the first optical film sequentially and transmitted toward the wavelength conversion module.

17. The projection apparatus according to claim 16, wherein the conversion beam from the wavelength conversion module is reflected by the first optical film and transmitted toward the filter module.

18. The projection apparatus according to claim 11, wherein the light splitting and combining module comprises a polarization beam splitter and a wavelength beam splitter, wherein the polarization beam splitter is disposed on the transmission path of the at least one excitation beam from the excitation light source module, wherein a part of the at least one excitation beam from the excitation light source module is reflected by the polarization beam splitter and forms the first excitation beam, another part of the at least one excitation beam from the excitation light source module forms the second excitation beam after passing through the polarization beam splitter, and the polarization state of the first excitation beam is different from the polarization state of the second excitation beam; and the wavelength beam splitter is disposed on the transmission path of the second excitation beam from the polarization beam splitter.

19. The projection apparatus according to claim 18, wherein the first excitation beam from the polarization beam splitter is reflected sequentially by the at least one light filtering area, the wavelength beam splitter, and the polarization beam splitter and transmitted toward the wavelength conversion module, and the second excitation beam from the wavelength beam splitter is reflected by the at least one light filtering area, passes through the polarization beam splitter, and then is transmitted toward the wavelength conversion module.

20. The projection apparatus according to claim 19, wherein the conversion beam from the wavelength conversion module is transmitted toward the filter module after being transmitted through the light splitting and combining module.

* * * * *